March 8, 1960   F. BERGMANN   2,927,896
PRODUCTION OF FERRITES
Filed Dec. 9, 1955
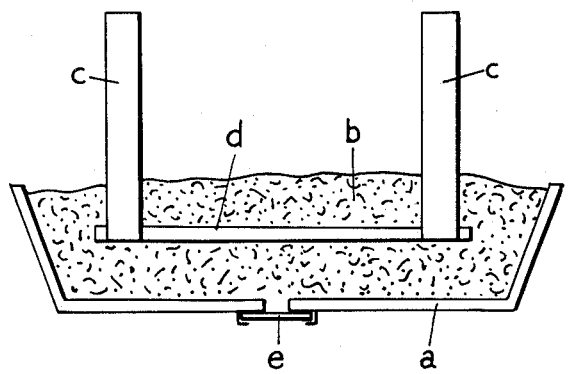
INVENTOR:
FRIEDRICH BERGMANN
ATT'YS United States Patent Office 2,927,896
Patented Mar. 8, 1960

2,927,896
PRODUCTION OF FERRITES

Friedrich Bergmann, Ludwigshafen am Rhein, Germany, assignor to Badische Anilin- & Soda Fabrik Aktiengesellschaft, Ludwigshafen am Rhein, Germany Application December 9, 1955, Serial No. 552,176

Claims priority, application Germany December 10, 1954

6 Claims. (Cl. 252—62.5)

This invention relates to improvements in the manufacture of ferrites.

Magnetic ferrites are being used in the electrical industry to an increasing extent by reason of their special magnetic and electrical properties. The magnetic ferrites are compounds of ferric oxide and one or more oxides of bivalent metals. They are used, among other things, as materials for the production of coil cores for alternating current, as for example, for pupin coils, filter coils, transmitter cores, high frequency cores and also for the construction of permanent magnets if they have a non-cubical structure.

Ferrites can be prepared by intimately mixing the metal oxides which form the ferrite, pressing the mixture into the desired moulds, preferably after a preliminary sintering and subsequent comminution, and sintering the pressed articles at high temperature, thereby the desired ferrite being formed by diffusion. Ferrites can also be produced by oxidative melting down of the metals, the oxides of which form the ferrite as disclosed in my copending application Serial Number 274,280, filed February 29, 1952, of which the present application is a continuation-in-part and which is now abandoned.

I have now found that magnetic ferrites can be prepared in a simple way by fusion of the oxides forming the ferrite by generating the high temperature necessary for the melting by means of heat formed by the passage of an electrical current through the oxides. In order to avoid a reaction of the melt with the crucible wall, it is preferable to melt down the oxides in a bed which has been prepared from powdered or pieced ferrite of the same kind or from a mixture of the oxides which form the ferrite, so that the melt can only come into contact with the ferrite or the oxide mixture and not with the crucible wall.

It has been found that the specific electrical resistance of the oxides in the cold state is in general very high and only falls to a value suitable for a resistance heating with voltages normally available, say 50 volts, at elevated temperatures. As a result the specific resistance being by about $10^3$–$10^4$ lower at 1000° C. than at room temperature it is preferable to preheat the oxides by resistance heating of a metallic conductor embedded in the oxide, preferably of one of the metals the oxides of which form the ferrite, until the heated oxides can take over the conduction of the current.

As the iron oxide it is preferable to use, at least partially, ferrosoferric oxide ($Fe_3O_4$), because this has a considerably higher conductivity than ferric oxide ($Fe_2O_3$) and therefore facilitates the passage of the current.

The molten material may either be made into shaped ferrite articles by being run into and allowed to solidify in an appropriate mold, or into unshaped solids, for example by spreading the fused oxides on a cooled iron plate as a layer, suitably while sprinkling on water, the the unshaped solids then being comminuted and ground to powder in a ball mill. This powder can be used for making cores with or without binders, the cores being sintered in conventional manner in the air or another atmosphere at temperatures of about 1100°–1400° C.

By this process it is possible to prepare not only ferrites which have soft, temporary magnetic properties, as for example manganese-zinc ferrite, nickel-zinc ferrite, magnesium-zinc ferrite and manganese ferrite, but also permanent magnetic ferrites, such as barium, strontium or cobalt ferrites.

The nature of my invention will appear in greater detail from the examples hereinafter taken in connection with the accompanying drawing.

*Example 1*

A pulverulent mixture $b$ of 11.6 kilograms of ferrosoferric oxide, 3.52 kilograms of manganese dioxide and 2.78 kilograms of zinc oxide is charged into a crucible $a$ of rectangular cross-section, 50 centimetres long, 12 centimetres wide and 10 centimetres deep, the walls of which consist of refractory bricks. Between two iron electrodes $c$ 5 centimetres in diameter and 40 centimetres long, there is arranged a band iron $d$ 45 centimetres long, 1.5 centimetres wide and 0.4 centimetre in thickness in such a way that the ends of the band iron are clamped in grooves provided at the lower ends of the iron electrodes. This band iron $d$ is arranged within the crucible $a$ filled with the oxide mixture, and the electrodes $c$ project above the crucible at both ends thereof. The regulatable low frequency alternating voltage (50 cycles) of a high current transformer is applied to the electrodes $c$. With a voltage of about 20 volts applied to the electrodes $c$, the band iron $d$ situated in the oxide mixture $b$ becomes hot at an initial passage of current of about 300 amperes and the oxide mixture $b$ is thus heated up. By further raising the temperature of the band iron $d$ by increasing the current to 500 amperes, the band iron $d$ heats up to fusion temperature, i.e. to about 1640° C., melts throughout and thus transfers the conduction of the current to the heated oxide mixture $b$, the conductivity of which has been so increased in the meantime by the heating effected by the band iron $d$ that a current of about 500 amperes passes at a voltage of about 27 volts at the electrodes $c$. In a short time, the oxide mixture $b$ in the neighborhood of the band iron $d$ melts, while the part situated at the outside does not melt and therefore acts as a kind of crucible lining. By further supply of current, the melt can be kept liquid until a uniformly composed melt has been formed. Care may be taken by blowing on oxygen that the melt acquires the correct oxygen content.

The crucible is tapped by opening the slide $e$ provided in the bottom of the crucible $a$ and by piercing the powder layer above the slide opening with a pointed iron rod, the melt running off onto an iron plate 4 centimetres in thickness and spreading thereon as a thin layer. The heat is thus discharged very rapidly and as a result the melt solidifies quickly. While solidfying, the product is sprinkled with water; it thus becomes friable and can easily be comminuted. The comminuted product is ground with steel balls and water in a ball mill for 24 hours, the powder particles obtained having an average size of about 1–2$\mu$. When the water has been removed and the powder dried, a ring core is pressed therefrom in a steel mold at a pressure of 500 kilograms per square centimetre, sintered in a sintering furnace at 1300° C. for 4 hours with access of air, and cooled down quickly in the air by removing it from the furnace.

This core has the following characteristics:

Initial permeability, $\mu = 858$
Specific gravity, $s = 4.91$
Curie point $= 120°$ C.

Relative loss factor $\dfrac{\tan g\,\delta}{\mu}$ at 5 kc./s. $= 1.6 \cdot 10^{-6}$ Relative hysteresis coefficient $\dfrac{h}{\mu}$ at 5 kc./s. $= 1.6 \cdot 10^{-3}$ When waste occurs in the production of the ferrite or ferrite core, this comminuted, preferably ground, ferrite can be melted down together with the said oxide mixture in the same way. Furthermore, comminuted ferrite of the composition may be used for lining the channel instead of the oxide mixture.

*Example 2*

The major portion of a pulverulent mixture $b$ of 58 kilograms of ferrosoferric oxide, 16.5 kilograms of manganese dioxide (these two substances having been passed through a screen having meshes 0.75 millimetre in width), and 14 kilograms of pulverulent zinc oxide is charged in a crucible $a$ and tamped firm therein. The crucible, made of sheet iron 2 millimetres in thickness, has a rectangular top view shape with its long-side walls widening out upwards. The measures of the crucible are 100 centimetres in length, 14 centimetres in height and 25 centimetres in width at medium height. A band iron $d$, 80 centimetres in length, 2 centimetres in width and 0.2 centimetre in thickness is then placed on the tamped-down powder mixture in the middle of the crucible and iron electrodes $c$, 35 centimetres in length and 8 centimetres in thickness, are placed on the ends of the said band iron. This done, the rest of the oxide mixture is put on to form a layer covering the band iron by 2 centimetres.

Applied to the two iron electrodes is the regulatable voltage (50 c./s.) of a high-voltage transformer. With an initial voltage of 10 volts, the current is 700 amperes at the start, but drops off to 300 amperes within 3 minutes. After five and one-half minutes the iron band has fused which is indicated by a sudden drop in the amperage. Then the voltage is raised to 30 volts, the current rising slowly to 2000 amperes. After the flow of current has lasted for 45 minutes, the contents of the crucible has fused between the two electrodes. The melt is stirred and drawn off by opening the slide provided in the bottom of the crucible and piercing the powder layer above the slide opening with a pointed iron rod. The liquid jet of the molten material falls on the iron plate, 4 centimetres thick, of an iron table underneath the crucible, spread thereon to form a thin layer, and is fast cooled by spraying on water. The material thus rendered friable is then pounded manually with an iron pestle. The quantity drawn off is 44 kilograms and the consumption of electrical energy is 31 kilowatt-hours.

The pounded material is ground with steel balls and water in a ball mill for 48 hours, stripped of water, and then pressed into an annular core under a pressure of 50 kilograms per square centimetre, the annular core being sintered in a sintering furnace at 1250° C. for 4 hours with the access of air and cooled down to ambient temperature within an hour.

This annular core has the following characteristics:

Initial permeability, $\mu = 1225$
Curie point $= 140°$ C.

Relative loss factor $\dfrac{\tan g\,\delta}{\mu}$ $\begin{cases} \text{at 5 kc./s.)} = 0.92 \cdot 10^{-6} \\ \text{at 100 kc./s.)} = 6.62 \cdot 10^{-6} \end{cases}$ Relative hysteresis coefficient $\dfrac{h}{\mu^2}$ (at 5 kc./s.) $= 0.41 \cdot 10^{-3}$

*Example 3*

To prepare a permanent-magnetic barium ferrite the major portion of a pulverulent mixture $b$ of 31.5 kilograms of ferrosoferric oxide and 4.6 kilograms of barium oxide is filled in a rectangular crucible $a$ of sheet iron 2 millimetres thick, this crucible being 50 centimetres in length, 20 centimetres in width and 14 centimetres in height, and tamped firm therein. A band iron $e$, 43 centimetres long, 2 centimetres in width and 0.4 centimetre thick, was then placed on the tamped-in powder mixture in the middle of the crucible. Put up on either end of the iron band is an iron electrode $c$ of circular cross-section, 40 centimetres long and 5 centimetres thick. Then the rest of the oxide mixture is poured on to form a layer covering the band iron by approximately 2 centimetres. Applied to the two iron electrodes is the regulatable voltage (50 c./s.) of a high voltage transformer. The voltage first applied to the electrodes is 10 volts and the consequent intensity of the current passed through the band iron is 600 amperes. As a result the band iron is heated and, in turn, will heat the oxide mixture surrounding it. When the flow of the current of the said amperage has lasted for 32 minutes, the voltage is raised to 20 volts with the current intensity rising to 2000 amperes within another eleven minutes. At the end of this time the contents of the iron crucible between the electrodes has fused. After stirring the melt energetically, the slide provided in the bottom of the crucible is opened and the crucible tapped by piercing the powder layer above the said slide opening with a pointed iron rod. The jet of the molten material emerging through the tapping hole falls on the iron plate, 4 centimetres in thickness, of an iron table underneath the crucible, spread thereon to form a thin layer and is quickly cooled by spraying on water. The material thus rendered friable is then pounded manually with an iron pestle. The molten and tapped-off quantity is 8 kilograms. The material is ground with steel balls and water in a ball mill for 24 hours, the ground material is stripped of the water and pressed into cores under a pressure of 500 kilograms per square centimetre, the cores being sintered in a sintering furnace at 1100° C. for 4 hours with the access of air.

In a magnetized condition the cores so prepared show marked permanent-magnetic properties. By way of example, when two annular cores of about 1 centimetre in thickness, having an outer diameter of 2.5 centimetres and an inner diameter of 1.2 centimetres, both magnetized in the direction of their height, are fitted over a glass tube as a guiding means with their like poles opposite each other, the bottom core, owing to repellency action, makes the upper core hover over it at a distance of two centimetres.

I claim:

1. The process for producing a magnetic ferrite by melting the metal oxides which form the ferrite, which comprises embedding a metallic conductor in a pulverulent mixture of the metal oxides which form the ferrite, said mixture being maintained in a bed situated in a container and which bed comprises a member selected from the group consisting of the ferrite being produced and said metal oxides mixture, whereby the resulting melt does not contact the container wall, said conductor being formed of one of the metals present in said oxides, passing an electric current through said conductor and thereby resistance heating the conductor which heats said oxides mixture to a temperature of substantial conductivity of the latter, passing the electric current through said heated oxides acting as a conductor and thereby resistance heating the oxides to the melting temperature, removing the melt from said container, and rapidly cooling said melt.

2. A process as defined in claim 1 with the additional steps of solidifying the melt, and converting the solidified mass into powder form.

3. A process as defined in claim 1 with the additional steps of solidifying the resulting melt, and providing the resulting ferrite in the form of a magnetic core.

4. A process as defined in claim 1 with the additional step of solidifying the melt in a mould having the shape of the desired ferrite body.

5. A process as defined in claim 1 wherein at least part of the iron oxide content of the metal oxides is in the form of ferroso-ferric oxide.

6. A process as defined in claim 2 wherein the solidified mass is quenched in water before being powdered.

References Cited in the file of this patent

UNITED STATES PATENTS

| | | |
|---|---|---|
| 2,110,967 | Andrews | Mar. 15, 1938 |
| 2,461,442 | Pritz | Feb. 8, 1949 |

FOREIGN PATENTS

| | | |
|---|---|---|
| 712,453 | Great Britain | July 21, 1954 |

OTHER REFERENCES

"Electric Furnaces," by Borchers, Longmans Green & Co., 1908, pp. 74–79.

New Developments in Ferromagnetic Materials, by Snoek, Elsevier Pub. Co., 1947, p. 71.

Proceedings of the IRE (vol. 43, No. 12, 1955), pp. 1945–1973.